(12) United States Patent
Lehman

(10) Patent No.: US 6,789,045 B2
(45) Date of Patent: Sep. 7, 2004

(54) TIME AND WORK TRACKER FOR SERVERS

(75) Inventor: Michael G. Lehman, Los Altos, CA (US)

(73) Assignee: Discovision Associates, Irvine, CA (US)

( * ) Notice: Subject to any disclaimer, the term of this patent is extended or adjusted under 35 U.S.C. 154(b) by 0 days.

(21) Appl. No.: 10/250,195

(22) Filed: Jun. 11, 2003

(65) Prior Publication Data

US 2003/0195717 A1 Oct. 16, 2003

Related U.S. Application Data

(63) Continuation of application No. 09/683,784, filed on Feb. 13, 2002, now Pat. No. 6,581,025, which is a continuation-in-part of application No. 09/740,412, filed on Dec. 19, 2000, now Pat. No. 6,397,167, which is a continuation of application No. 09/374,050, filed on Aug. 13, 1999, now Pat. No. 6,185,514, which is a continuation of application No. 08/987,908, filed on Dec. 9, 1997, now Pat. No. 5,963,914, which is a continuation of application No. 08/732,675, filed on Oct. 15, 1996, now Pat. No. 5,696,702, which is a continuation of application No. 08/423,029, filed on Apr. 17, 1995, now abandoned.

(51) Int. Cl.[7] .............................................. G06F 15/00
(52) U.S. Cl. ...................................................... 702/178
(58) Field of Search .......................... 702/178; 345/700, 345/764, 606, 589; 705/8; 399/82; 709/203; 235/402; 435/28, 6; 370/535, 242; 342/397, 340.1; 700/1; 343/765; 710/15; 340/573; 358/1.13, 1

(56) References Cited

U.S. PATENT DOCUMENTS

| 3,512,159 A | 5/1970 | Clark ........................... 346/86 |
| 3,611,423 A | 10/1971 | Rutsche ........................ 346/86 |
| 4,516,138 A | 5/1985 | Iwasawa et al. .............. 346/80 |
| 4,819,162 A | 4/1989 | Webb, Jr. et al. ............ 364/401 |
| 5,155,680 A | 10/1992 | Wiedemer .................... 364/406 |
| 5,182,705 A | 1/1993 | Barr et al. |
| 5,255,183 A | 10/1993 | Katz ........................... 364/406 |
| 5,305,238 A | 4/1994 | Starr, III et al. ............. 364/569 |
| 5,321,838 A | 6/1994 | Hensley et al. .............. 395/700 |
| 5,349,662 A | 9/1994 | Johnson et al. |
| 5,388,252 A | 2/1995 | Dreste et al. |
| 5,448,729 A | 9/1995 | Murdock ..................... 395/600 |
| 5,696,702 A | 12/1997 | Skinner et al. |
| 5,717,867 A | 2/1998 | Wynn et al. |
| 5,987,614 A | 11/1999 | Mitchell et al. |
| 6,100,806 A * | 8/2000 | Gaukel ..................... 340/573.4 |

FOREIGN PATENT DOCUMENTS

EP       0 391 678 A3    10/1990

OTHER PUBLICATIONS

Chaney, S., "If You Bill Clients By The Hour, TRACK Can Simplify Your Life, "PC MAgazine, vII, N1, Jan. 11, 1992, p. 387(3).

Levy, Michael "Electronic Monitoring in the Workplace: Power through the Panopticon," http://www.sims.berkeley.edu/impact/s94/students/mike–pap.html.

IBM Technical Disclosure Bulletin, vol. 30, No. 9, Feb. 1998, New York, US, pp. 458–459, XP002011210, "PC Configurable Time Keeper".

IIBM Technical Disclosure Bulletin, vol. 27, No. 4B, Sep. 1984, New York, US p. 2438, XP0052011211, "Method for organizing User Tasks in a Multi–Tasking Workstation".

* cited by examiner

*Primary Examiner*—John Barlow
*Assistant Examiner*—Tung Lau
(74) *Attorney, Agent, or Firm*—Keiji Masaki; Steve Wong; Caroline Do

(57) ABSTRACT

A time and work tracker that automatically collects and analyzes information about time and work performed on a wireless device is described herein. According to the present invention, a time and work tracking function is initiated on a wireless device. Thereafter, a user begins to perform work on the wireless device. As the user works, the tracking function on the wireless device collects data relating to the activities performed by the user. The collected data is then analyzed to determine what types of work the user has actually performed.

20 Claims, 12 Drawing Sheets

TIME AND WORK TRACKER FOR SERVERS

CROSS REFERENCE TO RELATED APPLICATIONS

This application is a continuation of patent application Ser. No. 09/683,784, filed Feb. 13, 2002, now U.S. Pat. No. 6,581,025 which is a continuation-in-part of patent application Ser. No. 09/740,412, filed Dec. 19, 2000, now U.S. Pat. No. 6,397,167 granted May 28, 2002, which is a continuation of patent application Ser. No. 09/374,050 filed Aug. 13, 1999, now U.S. Pat. No. 6,185,514 granted Feb. 6, 2001, which is a continuation of patent application Ser. No. 08/987,908 filed Dec. 9, 1997, now U.S. Pat. No. 5,963,914 granted Oct. 5, 1999, which is a continuation of patent application Ser. No. 08/732,675 filed Oct. 15, 1996, now U.S. Pat. No. 5,696,702 granted Dec. 9, 1997, which is a continuation of now U.S. patent application Ser. No. 08/423,029, filed on Apr. 17, 1995, now abandoned and all of which are incorporated by reference herein in their entirety.

COPYRIGHT STATEMENT

All of the material in this patent document is subject to copyright protection under the copyright laws of the United States and of other countries. Portions of the material in this patent document are also subject to protection under the maskwork registration laws of the United States and of other countries. The owner of the copyright and maskwork rights has no objection to the facsimile reproduction by anyone of the patent document or the patent disclosure, as it appears in the United States Patent and Trademark Office file or records, but otherwise reserves all copyright and maskwork rights whatsoever.

BACKGROUND OF INVENTION

1. Field of the Invention

The present invention relates generally to systems for recording time expended in performing tasks, and more particularly, to systems for automatically recording time and predetermined activity performed on a wireless device by monitoring file activity and the like.

2. Background of the Invention

Telecommuting refers to work being done at locations other than a central location. Telecommuters are typically knowledge workers who work primarily on tasks, which require mental or intellectual activity, rather than on tasks which require physical or capital intensive work at a central location. Many telecommuters use personal computers at their remote work site. One of the biggest obstacles to implementation of telecommuting is that managers would not be able to tell if their telecommuting employees were actually working. Another obstacle is the problem of how to measure the productivity of telecommuting employees. A manager needs to trust that a telecommuting employee is working and trust is developed through quality communications between the central site and the remotely located telecommuting worker.

Several important business economic concerns are all positively affected by telecommuting, including: maintaining or increasing productivity; decreasing office space needs; attracting or retaining critical skills among the staff; and compliance with air quality or other environmental regulations.

Professional knowledge workers, such as computer programmers, bill their time for work done on their computers. The problem of how to monitor their time and activities on their computer, as well as how to automatically calculate the cost of these activities for accounting purposes, needs to be solved. Many invoicing systems rely on the manual inputting of the billable time and a technique is required to determine the accuracy of that billed time. In the custom software programming business, specifications often change so that more time is expended than is originally projected and a customer needs to receive accurate documentation for additional time to be billed.

Therefore, there is a need that exists to selectively and automatically measure the actual amount of work done on various projects on a computer or personal computing device by an operator, such as a telecommuter. The measurement of the actual amount of work done may be accomplished at either a local site, at a site on a network where the user has a number of input devices, or at a remote location. The invention disclosed herein, as well as in U.S. Pat. No. 6,185,514, which is hereby incorporated by reference in its entirety, serves to satisfy this need, as well as others.

Wireless Devices

The proliferation of wireless communications has further enhanced productivity. Wireless devices offer additional opportunities for tracking and/or monitoring work, such as file activity and the like. There are four (4) general operating types of wireless devices currently available. These include: (1) Streaming audio/video devices, such as cellular phones; (2) Personal Data Assistants (PDAs), which are portable messaging and database computing devices, such as the Palmâ□¢ Pilot, Blackberryâ□¢, and PocketPCâ□¢ devices, for instance; (3) General purpose computing devices, such as notebook computers configured with Bluetoothâ□¢ or other wireless connectivity, including WiFi and IEEE 802.11 connectivity, for instance; and Non-computing appliances, which are dedicated purpose computing devices, such as smartrefrigerators, automobiles, or microwaves to name a few.

As with computing devices that are stand-alone or rely on a conventional wired connection, many telecommuters now perform work activities on wireless devices. For the same reasons that it is desirable to measure the actual amount of work performed on a stand-alone or wired computing device, it is desirable to measure similar activities on wireless devices. For instance, a work activity for a user might comprise a cellular telephone call. It would be desirable to track and monitor the time spent on the cellular phone call. Currently, however, there is no manner in which to monitor the actual work activities performed on a wireless device.

SUMMARY OF INVENTION

An object of the invention is to automatically collect and analyze information about time expended and work performed on a wireless device. The term work is used broadly and includes, but is not necessarily limited to, any meaningful activity the accounting of which may be of some significance. According to the present invention, a time and work tracking function is initiated on a wireless device. Thereafter, a user begins to perform one or more activities on the wireless device. As the user performs activities, the time and work tracking function collects data relating to the activities performed by the user, classifies the activities, determines which activities constitute meaningful work, and records the amounts of time spent on each activity also taking into account for idle periods where no activity occurs.

In one embodiment, the data collection occurs on the wireless device, for instance by generating a log file or storing data in a memory location regarding the activities performed and the time spent on each activity. Thereafter, a synchronization event occurs between the wireless device and a general purpose computing device, wherein the collected data (e.g., the log file or memory area) is transferred to the general purpose computer and the analysis of the data is performed there, rather than on the wireless device itself. This is useful, for instance when the wireless device is limited in its storage and processing capabilities. Alternatively, the collection and analysis of the data can occur wholly the wireless device or wholly on the server-side.

Wireless devices that may be used with the present invention include, for instance: streaming audio/video devices, such as cellular phones; PDAs; general purpose computing devices, such as notebook computers configured with Bluetoothâ€ or other wireless connectivity, including WiFi and IEEE 802.11 connectivity, for instance; and non-computing appliances, such as smart refrigerators, automobiles, and microwaves.

The types of activities that are tracked on the wireless device include: e-mail activities such as sending or receiving an e-mail; sending and receiving activities unrelated to e-mail; generic protocol I/O operations; radio activity; infrared activity; and streaming activity. Other types of activities that are tracked on the wireless device include: voice recognition activities, database accesses, custom applications, use of a Virtual Machine, such as Javaâ€ or Microsoftâ€ implementation, synchronization activities, uploads, downloads, setup and installation activities, and the use of conduits.

In one embodiment, a data collection function is instantiated in the memory of the wireless device. The function embeds itself as a hook between the operating system that controls the device and the application that the user interfaces with when performing the activities. The function executes in the background while the user runs other programs, and as the user changes the internal state of the programs (i.e., performs an activity), the function observes and records the state changes as well as the times the changes took place. An analysis function is also instantiated is a hook embedded between the operating system and the user applications and is configured to determine which state changes in the application constitute work (based upon user defined rules), who performed the work (based upon identification criteria), and how long it took to perform the work (based upon an activity timer).

In one embodiment, the data collector classifies all activities as either having a start, continue, or switch indication. As the data analyzer scans through the data collector, it starts a timer when a start event is reached. When there is a switch indication or a new activity starts, A new timer is initiated for the new event. The timer is configured to have an idle timeout period wherein an idle period is pre-determined and if a user initiates a work activity and then remains idle before starting a new activity, the timer stops when the idle period has passed. The activities that constitute work may be inputted to the system via a user interface before (or after) the time and work tracking begins.

Further objects and advantages of the invention will be brought out in the following portions of the specification, wherein the detailed description is for the purpose of fully disclosing preferred embodiments of the invention without placing limitations thereon.

BRIEF DESCRIPTION OF DRAWINGS

The invention will be more fully understood by reference to the drawings, which are for illustrative purposes only.

DETAILED DESCRIPTION

The present invention relates to a time and work tracker for wireless devices. Referring more specifically to the drawings, for illustrative purposes the present invention is embodied in the flowchart generally shown in FIG. 1 where an embodiment of a time and work tracker for a wireless device is shown.

Time and Work Tracker for a Wireless Device

Figure 1:
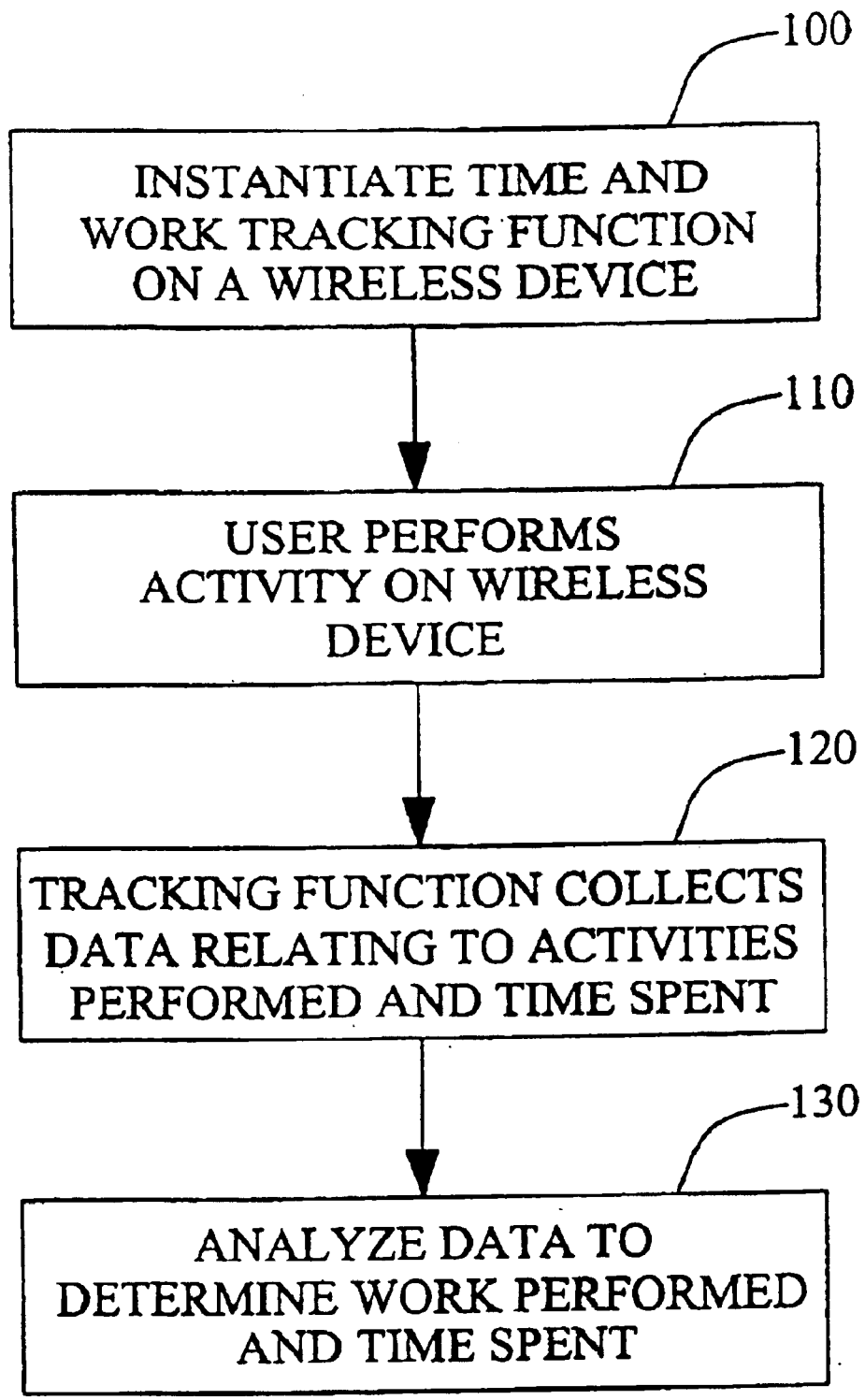
FIG. 1 is a flowchart showing a time and work tracker for a wireless device according to an embodiment of the present invention.

Referring now to FIG. 1, a time and work tracking function is initiated on a wireless device at block 100. At block 110, a user begins to perform an activity on the wireless device. As the user performs activities, the tracking function on the wireless device collects data relating to the activities performed by the user and when the activities occurred at block 120. The collected data is then analyzed at block 130 to determine what types of work the user has actually performed and how long it took to perform the work. Optionally, the analysis section sends the data to a print module, which prints a report regarding the work performed and the time spent. The activities that constitute work may be provided as input to the system via a user interface prior to initiating the time and work tracking function.

Figure 2:
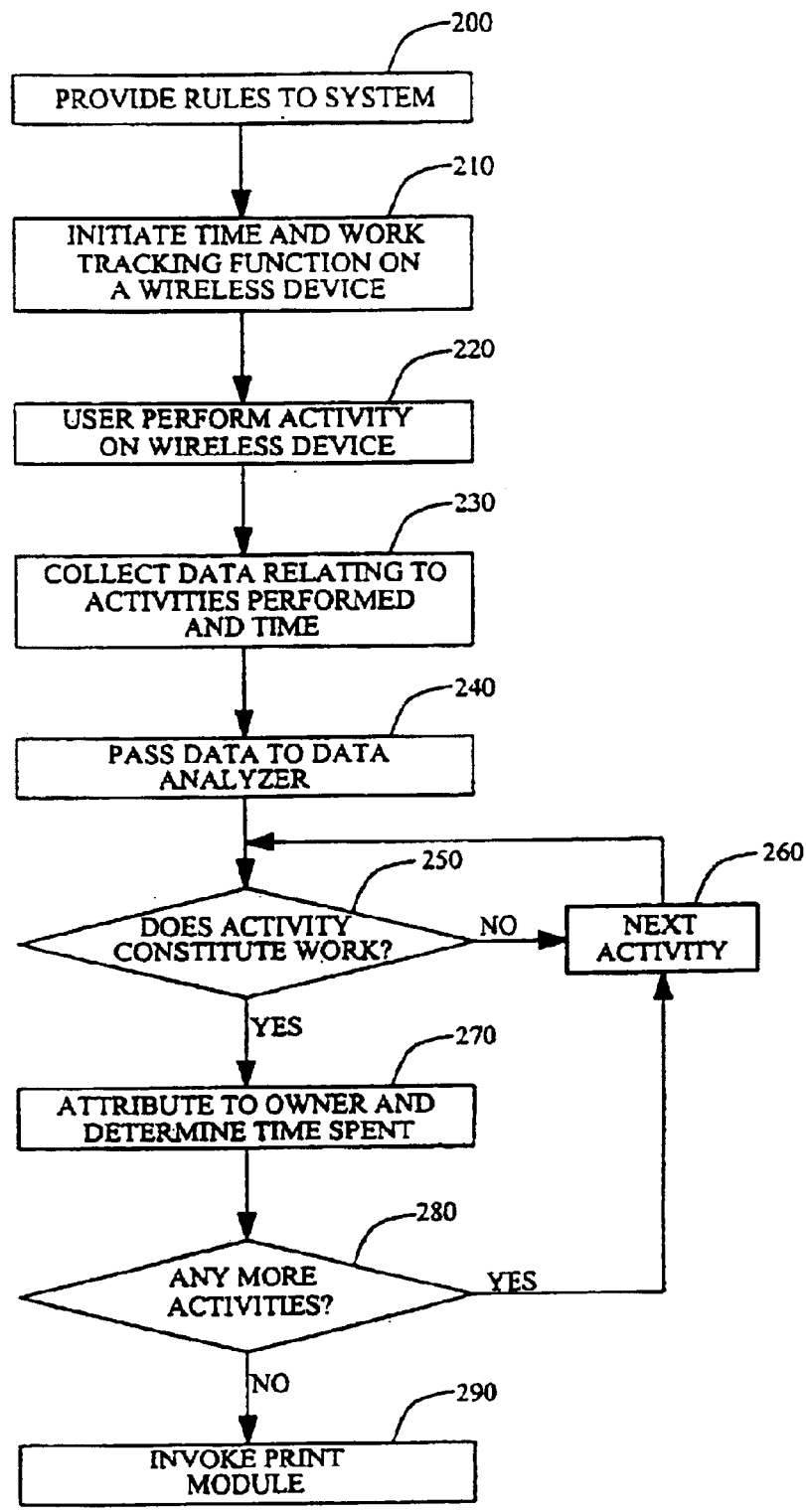
FIG. 2 is a flowchart showing a time and work tracker for a wireless device according to another embodiment of the present invention.

Another embodiment of the present invention is shown in FIG. 2. At block 200, a user provides rules to the system, for instance by accessing a graphical user interface (GUI). The rules specify what activities constitute work, and what indications in the work specify a user. For example, one rule might tell the system that a cellular phone call from a specific number is owned by Jones and if the call is to another specific number then that activity is to be defined as work.

Thereafter, a time and work tracking function is initiated on a wireless device at block 210 wherein a data collector begins to observe the activity on the wireless computing device. At block 220, a user begins to perform an activity on the wireless device. As the user performs activities, the tracking function on the wireless device collects data relating to the activities performed by the user and when the activities occurred at block 230. The collected data is then passed to a data analyzer at block 240. For each entry in the collected data, the analyzer determines if this activity constitutes work at block 250. If not, the next activity is obtained at block 260 and block 250 repeats. Otherwise, at block 270, the analyzer attributes the work to an owner and determines the time spent on the activity.

At block 280, it is determined if there are any more activities collected from the data collector. If so, block 260 repeats. Otherwise, at block 290 a print module is invoked where a report is generated in an appropriate format (digital, on paper, etc) which shows who performed what work and how long it took.

Figure 3:
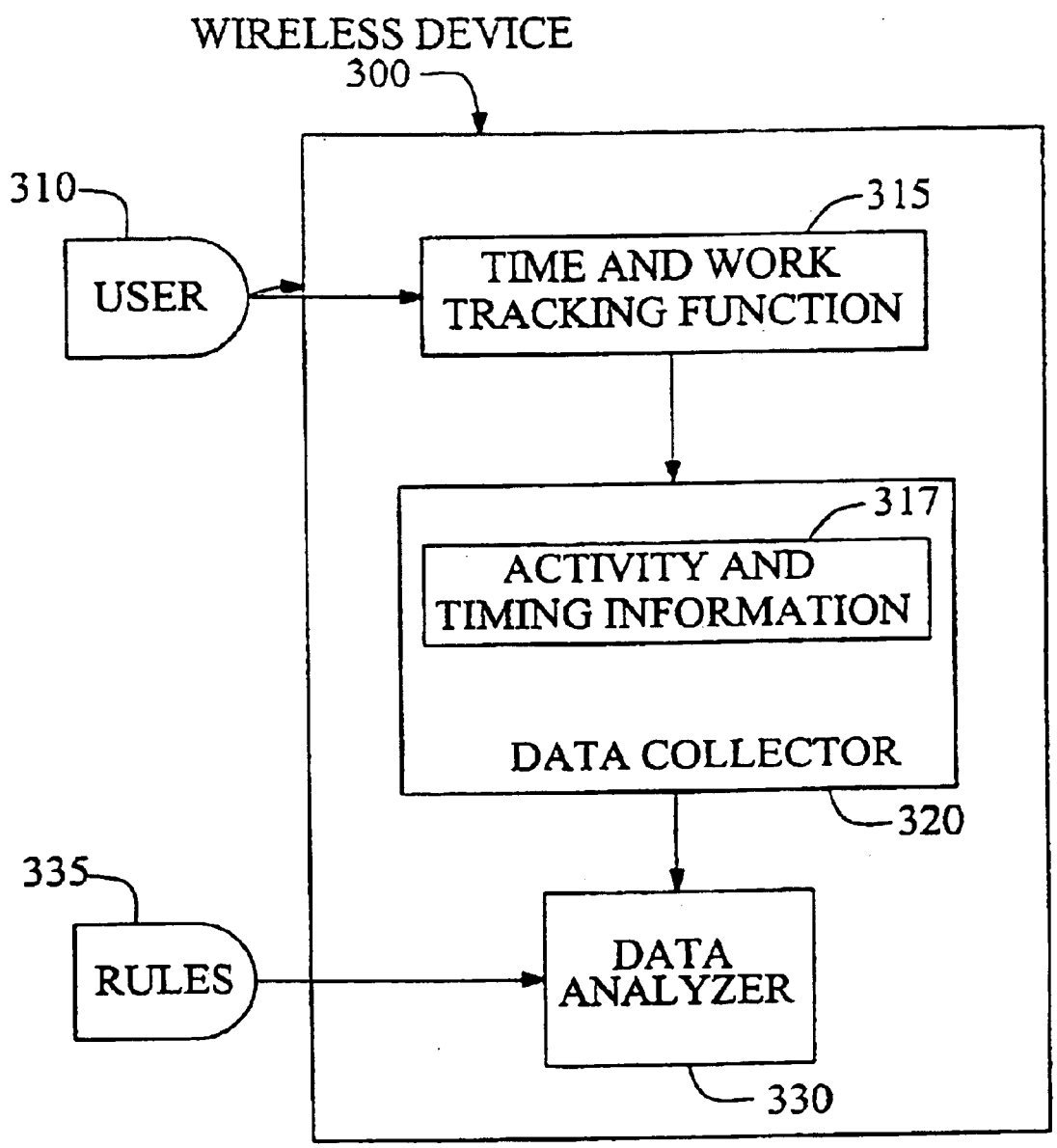
FIG. 3 is a block diagram showing the components of a time and work tracker for a wireless device according to an embodiment of the present invention.

FIG. 3 is a block diagram showing the components of an architecture configured to track work and time on a wireless device according to an embodiment of the present invention. Wireless device 300 obtains input from a user 310. A time and work tracking function 315 executes on wireless device 300 and based on user input 310 records activity and timing information 317 at data collection block 320. Data collection block 320 may comprise a log file or it may be a reserved memory block on the wireless device. When user activity is complete or simultaneous to the user activity, data analysis block 330 receives information from data collection block 320. Based on pre-determined rules 335, the data analysis block determines what recorded activities constitute work and how long each work activity took.

Synchronization Event

Figure 4:
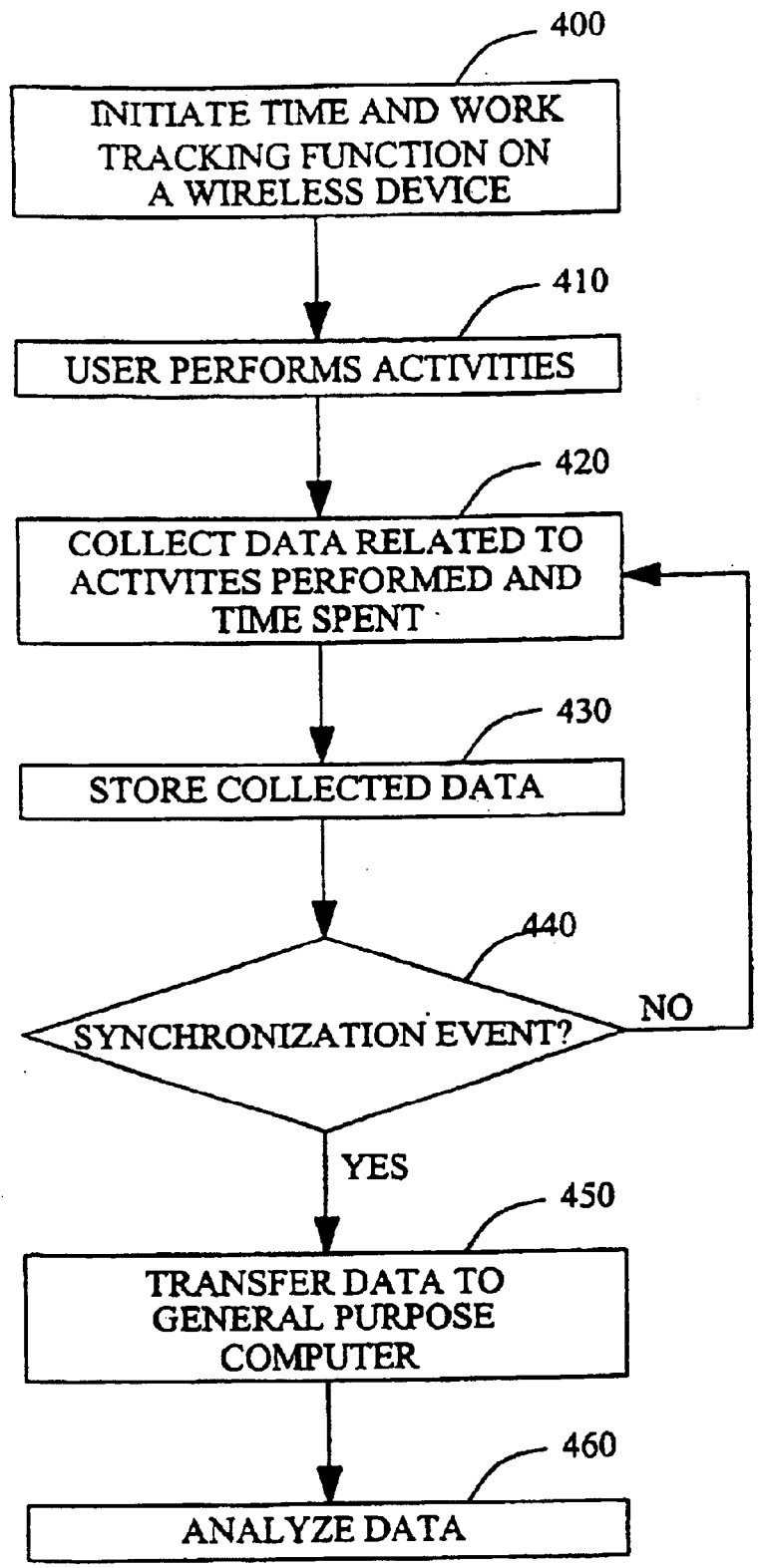
FIG. 4 is a flowchart showing a time and work tracker for a wireless device including a synchronization event according to an embodiment of the present invention.

In one embodiment, a synchronization event occurs between the wireless device and a general purpose computing device, wherein the collected data (e.g., the log file or memory area) is transferred to the general purpose computer and the analysis of the data is performed there. This is useful, for instance, when the wireless device is limited in its storage and processing capabilities. This embodiment of the present invention is shown in FIG. 4.

At block 400, a time and work tracking function is initiated on a wireless. At block 410, a user begins to perform activities on the wireless device. As the user works, the tracking function on the wireless device collects data relating to the activities performed by the user and the amount of time spent at block 420. At block 430, the collected data is stored, for instance in a log file or other appropriate memory location. At block 440, it is determined whether a synchronization event is occurring. If not, block 420 repeats and additional information is stored by the data collector, if any. If a synchronization event is occurring at block 440, then at block 450, the collected data is transferred to a general purpose computing device and at block 460, the data is analyzed to determine the actual work performed, the time spent performing the work, and the person who performed the work.

Time and Work Tracking Architecture

Figure 5:
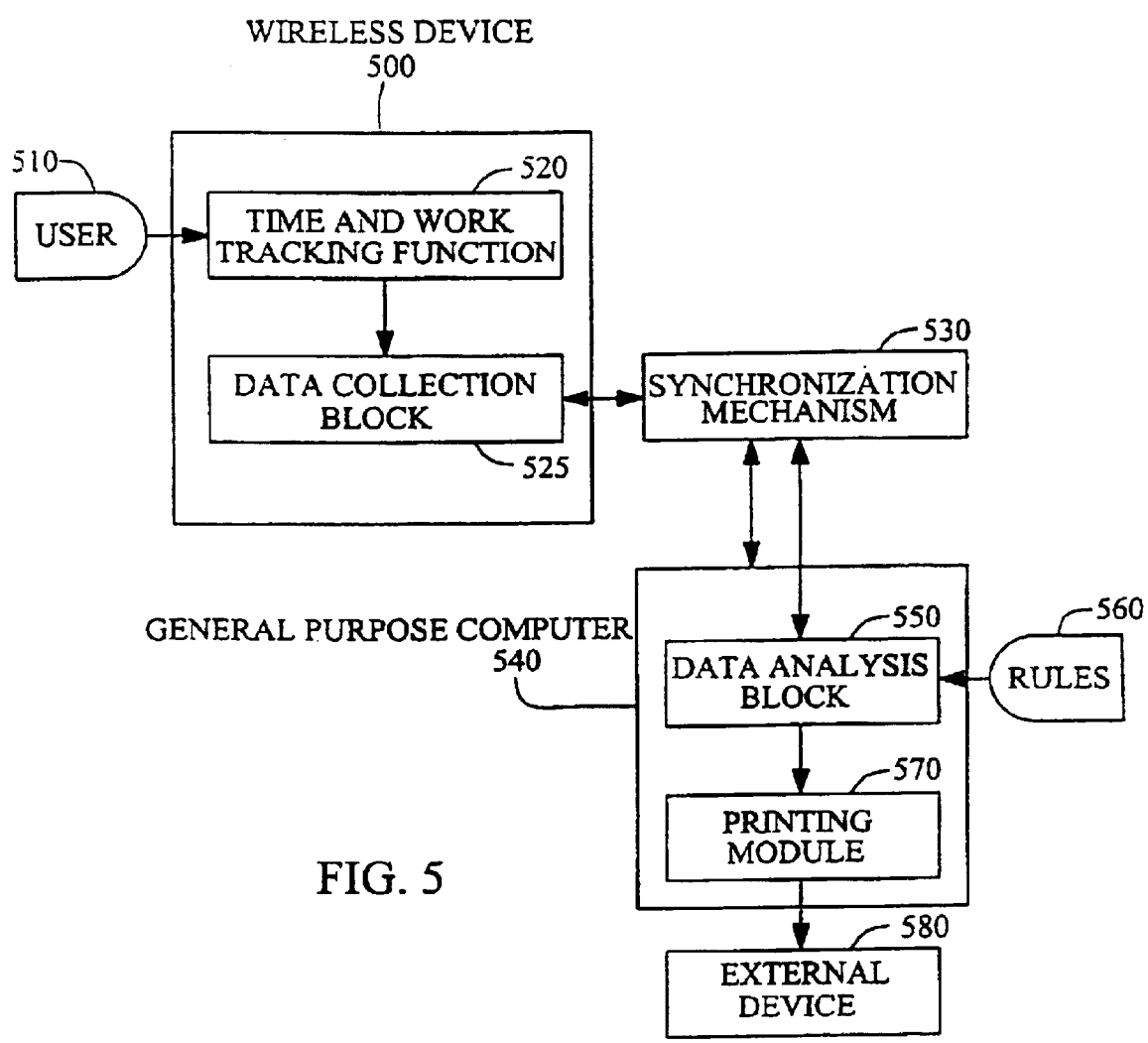
FIG. 5 is a block diagram showing the components of a time and work tracking architecture for a wireless device according to an embodiment of the present invention.

FIG. 5 is a block diagram showing the components of an architecture configured to track work and time on a wireless device according to an embodiment of the present invention. Wireless device 500 obtains input from a user 510. A time and work tracking function 520 executes on wireless device 500 and based on user input 510 records information as well as the timing of the activities at data collection block 525.

When the user's work is complete, or at another appropriate time, a synchronization mechanism 530 interposed between the wireless device 500 and a general purpose computer 540 is used to transfer information, for instance the log file, from data collection block 525, across synchronization mechanism, 530 and to a data analysis block 550 on general purpose computer 540. The synchronization mechanism 530 may be any of those known to those skilled in the art, including the hot-synch cradle developed by Palm. Based on pre-defined rules 560, the analysis block 550 uses the collected data to classify the activities as specific types of work and the amounts of time spent on each activity. Printing module 570 may optionally be used to transfer the analyzed data from block 550 to an external device 580, such as a printer.

Figure 6:
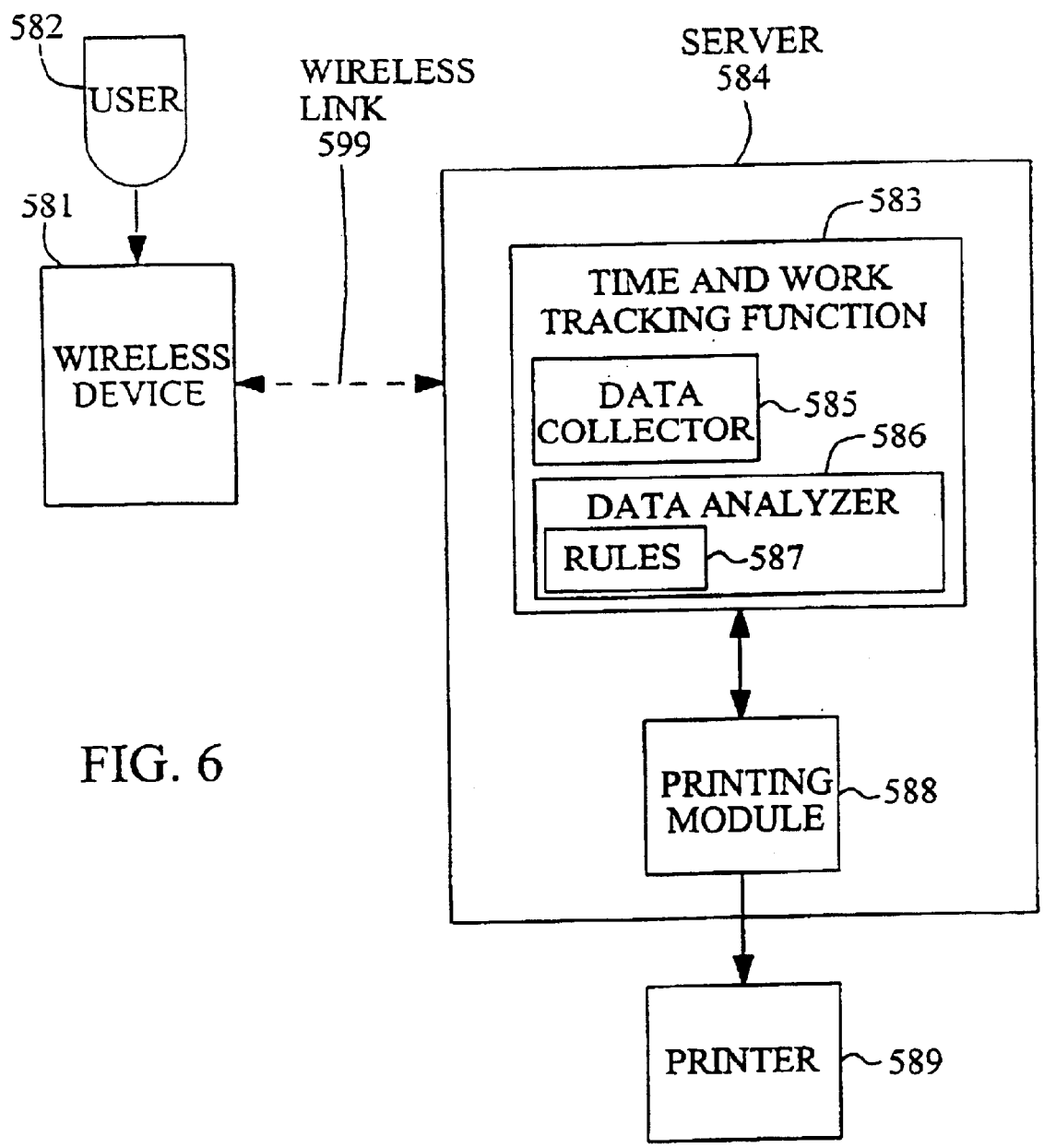
FIG. 6 is a block diagram showing the components of a time and work tracking architecture for a wireless device according to another embodiment of the present invention.

FIG. 6 is a block diagram showing the components of an architecture configured to track work and time on a wireless device according to another embodiment of the present invention. Wireless device 581 obtains input from a user 582. A time and work tracking function 583 executes on a server 584. The server 584 might be a general purpose computer or other device implemented by a service provider such as a phone company. The server 584 is coupled to the wireless device 581, for instance, by wireless link 599. Based on user input 582 the server 584 records information as well as the timing of the activities at data collection block 585, for instance a user might dial a telephone number, transmit data (in the form of digital voice packets) and then hang up. All of these events are collected in block 585.

When the user's work is complete (e.g., upon hanging up), or at another appropriate time, a data analysis block 586 on the server 584 receives the collected data, for instance in the form of a log file. Based on pre-defined rules 587, the analysis block 586 uses the collected data to classify the activities as specific types of work and the amounts of time spent on each activity. Printing module 588 may optionally be used to transfer the analyzed data from block 586 to an external device 589, such as a printer.

Embodiments of Wireless Devices

Wireless devices used in various embodiments of the present invention include, for instance: streaming audio/video devices, such as cellular phones; PDAs; general purpose computing devices, such as notebook computers configured with Bluetoothâ□⃗ or other wireless connectivity, including WiFi and IEEE 802.11 connectivity, for instance; and Non-computing appliances, such as smart refrigerators, microwaves, and automobiles, for instance. The general types of wireless devices are discussed in more detail below.

Cellular phones are an example of a streaming audio/video wireless device. A typical cellular phone is of a point-to-point nature, but current cellular phones are evolving into broadcast tools. One key feature of this type of device is its ability to handle unlimited streaming media connections. Interactions include dialing numbers, receiving calls, receiving messages, message length metering, internet communications, and the storage of media streams (MP3 songs, for instance). All of these interactions may be defined as rules that instruct the system according to the present invention that a work activity is occurring.

The Palm™ Pilot, Blackberry™, and Pocket PC™ devices are examples of portable messaging and database wireless devices. Such devices represent limited capacity, limited connection computing devices. These devices are typically used for e-mail, web surfing, calendaring, the use of contact lists, and the use of memo pads. Interactions with a user include access to internal databases (e.g., calendars, agendas, contacts, memos, and to-do lists), communications (e.g., wireless and infrared), messaging (e.g., e-mail and direct connect), web browsing and special dedicated applications. All of these interactions may be defined as rules that instruct the system according to the present invention that a work activity is occurring.

A laptop computer is an example of a general purpose computing device that is portable. With the introduction of Bluetooth™ technology, which allows random and casual LAN membership, such LAN membership can be monitored and tracked. For instance, a user might bring the portable computer to a copy center and without configuring or plugging the laptop in, cause a printer at the copy center to print a file on the laptop. Such an activity, if it is determined that it constitutes work, can be monitored by the present invention.

Non-computing appliances include, for instance, smart refrigerators, automobiles, and microwaves. Such appliances may be configured with Bluetooth™, WiFi, or IEEE 802.11 connectivity, for instance. While end-users may not need to know how the devices are working, it may be essential for service records and/or maintenance (e.g., MTBF monitoring).

Operating System Hook Functions

In one embodiment, the tracking function, which is configured to collect data comprises an operating system hook that embeds itself between the operating system and the user's applications. The hook executes in the background while the user runs other programs, and as the user changes the internal state of the programs (i.e., performs an activity), the hook function observes and records the state changes.

An analysis function, which may be a part of the same or a different hook function, is configured to determine which state changes in the application constitute work, by whom the work was performed, and how long did it take. For instance, an e-mail send operation to a specific server from a specific e-mail address might constitute work, so the analysis function determines when such work has occurred, who sent the message, and how long the activity took. Optionally a print module may be invoked to print a report regarding the work.

The analysis function also serves to record the amount of time taken for each work activity, for instance by using a timer, which begins when the activity starts and ends when a new activity starts. The timer may also be configured to have an idle timeout period wherein an idle period is pre determined and if a user initiates a work activity and then remains idle before starting a new activity, the timer stops when the idle period has passed. In this manner, only actual time expended is tracked.

Figure 7:
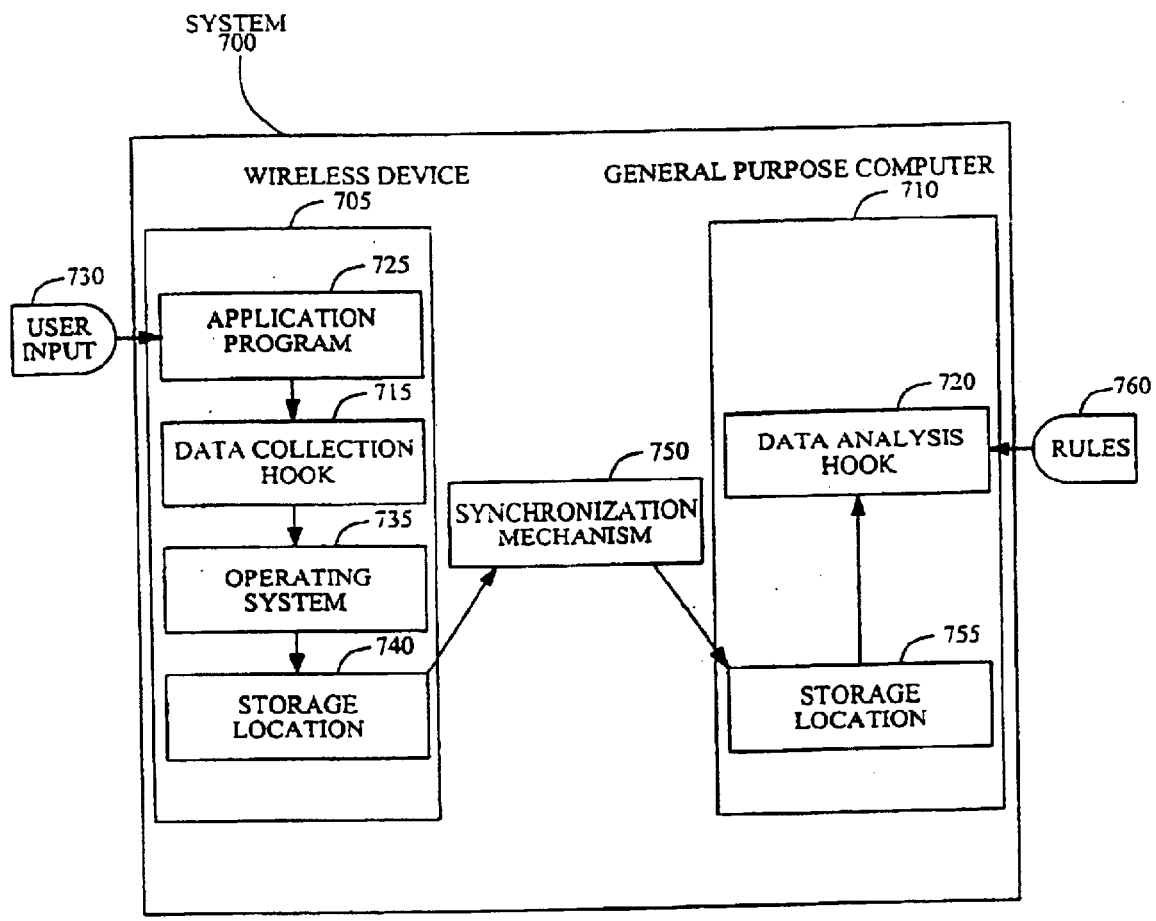
FIG. 7 is a block diagram showing the components of a time and work tracking architecture including hook functions according to an embodiment of the present invention.

FIG. 7 is a block diagram showing the use of hook functions for data collection and analysis according to an embodiment of the present invention. The system 700 comprises a wireless device 705 and a general purpose computer 710. Wireless device 705 includes a data collection hook 715. General purpose computer 710 includes a data analysis hook 720. An application program 725 on the wireless device (e.g., an e-mail client or database) is configured to receive user input 730. As user input is obtained, it is passed through data collection hook 715 and handled by the operating system of the wireless device 735 and transferred to a storage location 740, for instance a log file or memory location either on a hard disk or in random access memory (RAM).

A synchronization mechanism 750 is interposed between wireless device 705 and general purpose computer 710. The synchronization mechanism 750 is configured to transfer the collected data from storage location 740 on the wireless device 705 to storage location 755 on the general purpose computer 710. Data analysis hook 720 is configured to receive the collected data from storage location 755 and to analyze it based on pre-determined rules 760 that are given to hook 720 from a user prior to the hooks being loaded into the respective memories of their devices. Pre-determined rules 760 are entered, for instance, by a user accessing a GUI and specifying to the GUI which activities are to be counted as work.

Activity Timers

Figure 8:
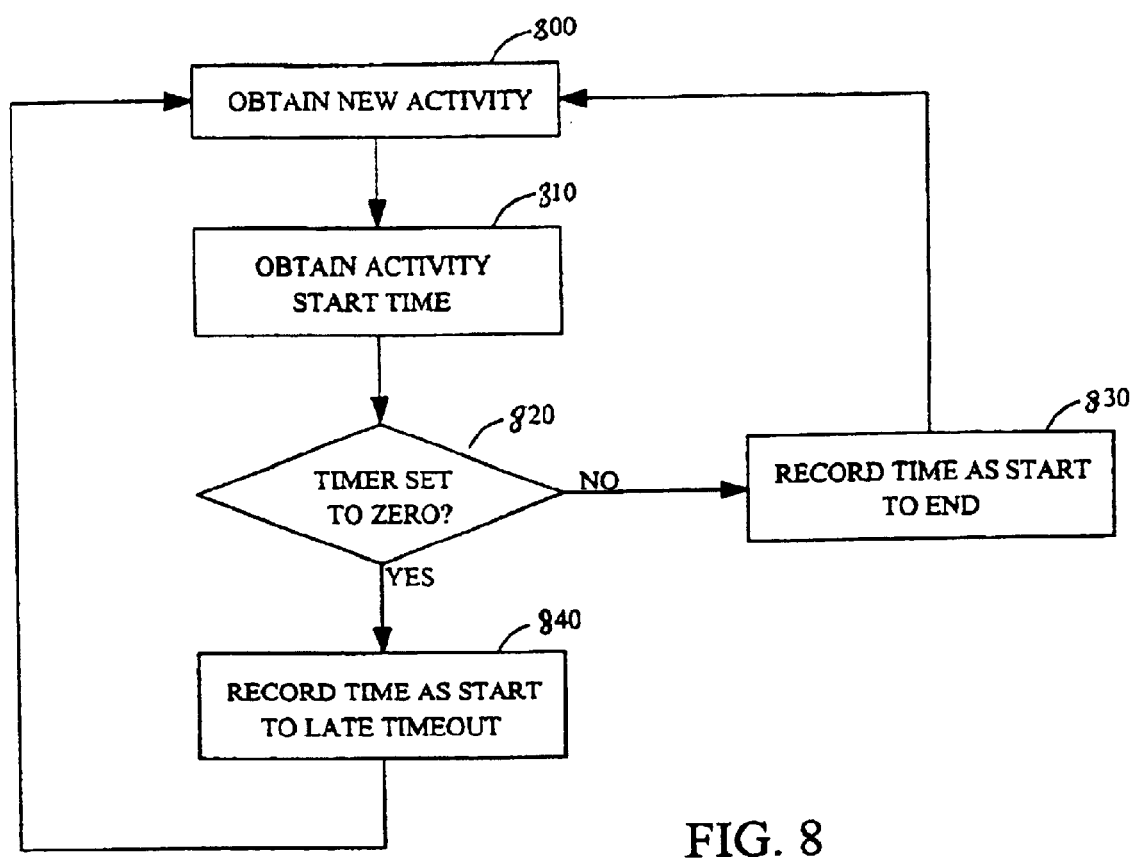
FIG. 8 is a flowchart showing the use of an activity timer according to one embodiment of the present invention.

One or more embodiments of the present invention use activity timers to accurately determine the amount of time it took to perform each work activity. The timers are configured where each activity that constitutes meaningful work is timed and when there is a lapse in activity during a single activity, that lapse is not counted toward the total time. This provides a more accurate determination of the time expended on a work activity. FIG. 8 is a flowchart showing the operation of an activity timer according to one embodiment of the present invention. At block 800, a new activity is obtained. At block 810, the start time for the activity is obtained. At block 820, it is determined if the timer has gone to zero. If not, then the duration of this activity is the start time to the end time. In this case, the time is recorded at block 830 as the total time. Otherwise, the timer has been set to zero in which case that means the idle timer had timed out. In that case, the total time is the start time until the timeout period was reached, which is recorded as the total time at block 840. Thereafter, block 800 repeats for the next activity after block 840 or 830.

Figure 9:
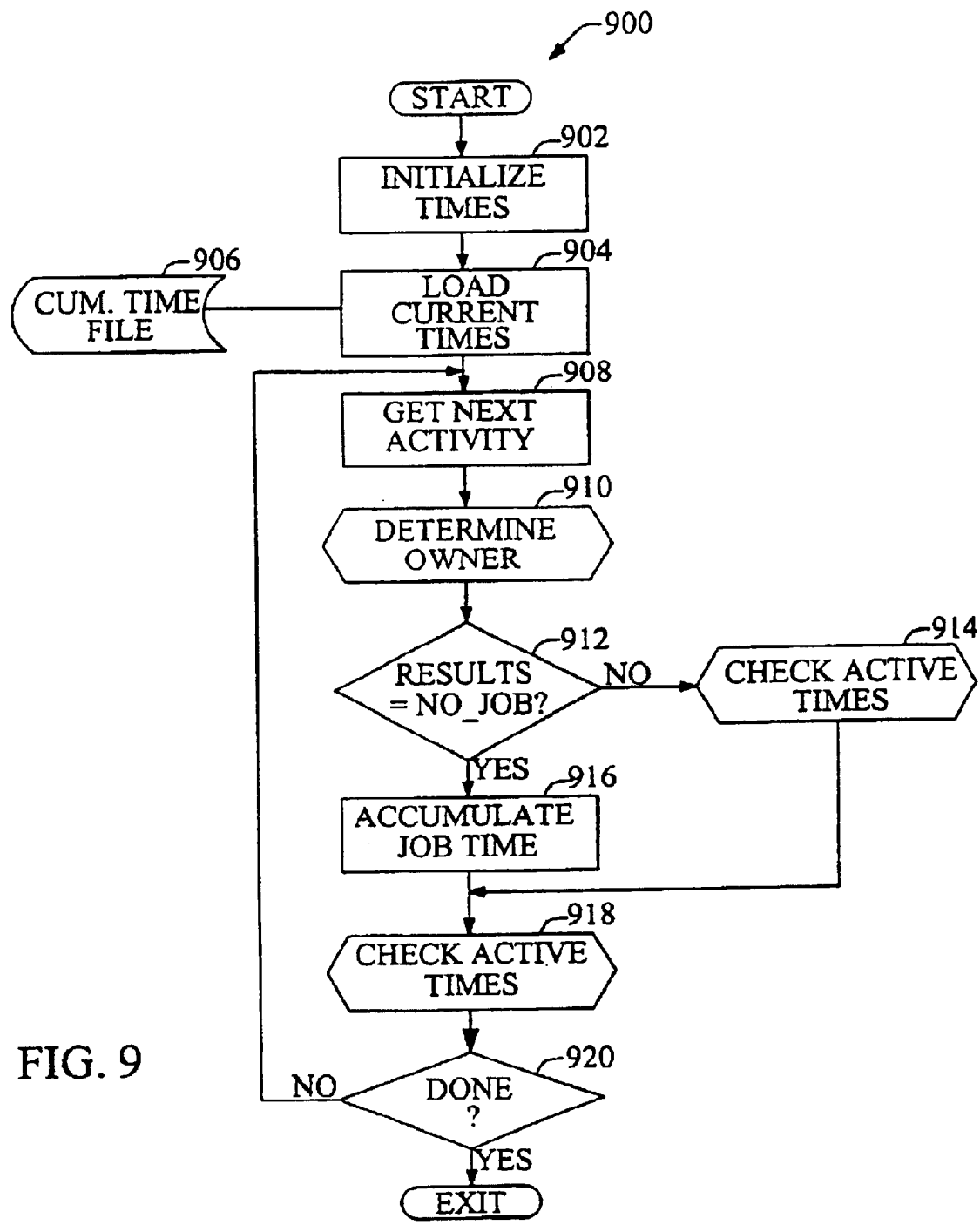
FIG. 9 is a flow chart illustrating the use of timers within an activity data analyzer routine for a system according to an embodiment of the present invention.

FIG. 9 is a flow chart illustrating the use of timers within an activity data analyzer routine 900 for a system according to the invention. Once all data is collected, analysis can be done either locally or remotely. With regard to time and this system, each task is divided up and has a stop watch. Unlike a typical stop watch, the button must continually be pressed to keep it going, otherwise it will stop. These are the active times used for this invention. All the stop watches are initialized to zero. A cumulative time file is used to store the amount of time already spent. These files are updated to cumulatively track work. Block 902 initializes the times to zero. Block 904 loads current cumulative times from a cumulative time file 906.

Block 908 gets the next activity and determines which tasks belong to that particular activity. Block 910 determines the owner of a particular activity. The owner of the activity is determined based on pre-defined rules. For instance, in the case of a cellular phone, it may be pre-determined that all calls from a specific number are owned by Jones.

Block 912 checks if a job or activity is not to be counted. Not every activity that the system might do belongs to a particular task. There are activities that don't belong anywhere, for example, when Jones calls a specific number, which may be his residence, for instance. The act of Jones calling home need not be counted because in this scenario it does not constitute meaningful work. In this case, for example, this result equals No_Job.

If the result is No_Job, Block 914 checks the active time. The stop watches do not automatically shut off. The system has to periodically look to see if they have been running too long without any activity and shut them off if the result was not equal to NoJob. If the result was equal to a particular job, then Block 916 accumulates the time for that particular job. This is analogous to actors who spin plates on top of sticks. If there is some activity for the user Jones, the system gives the Jones stick a little spin to keep the plate going. But if there is no continuing activity on Jones, eventually the plate will fall off the stick. Each activity is looked at to see who it belongs to and if it belongs to a certain person, then that person's plate is given another spin.

Figure 10:
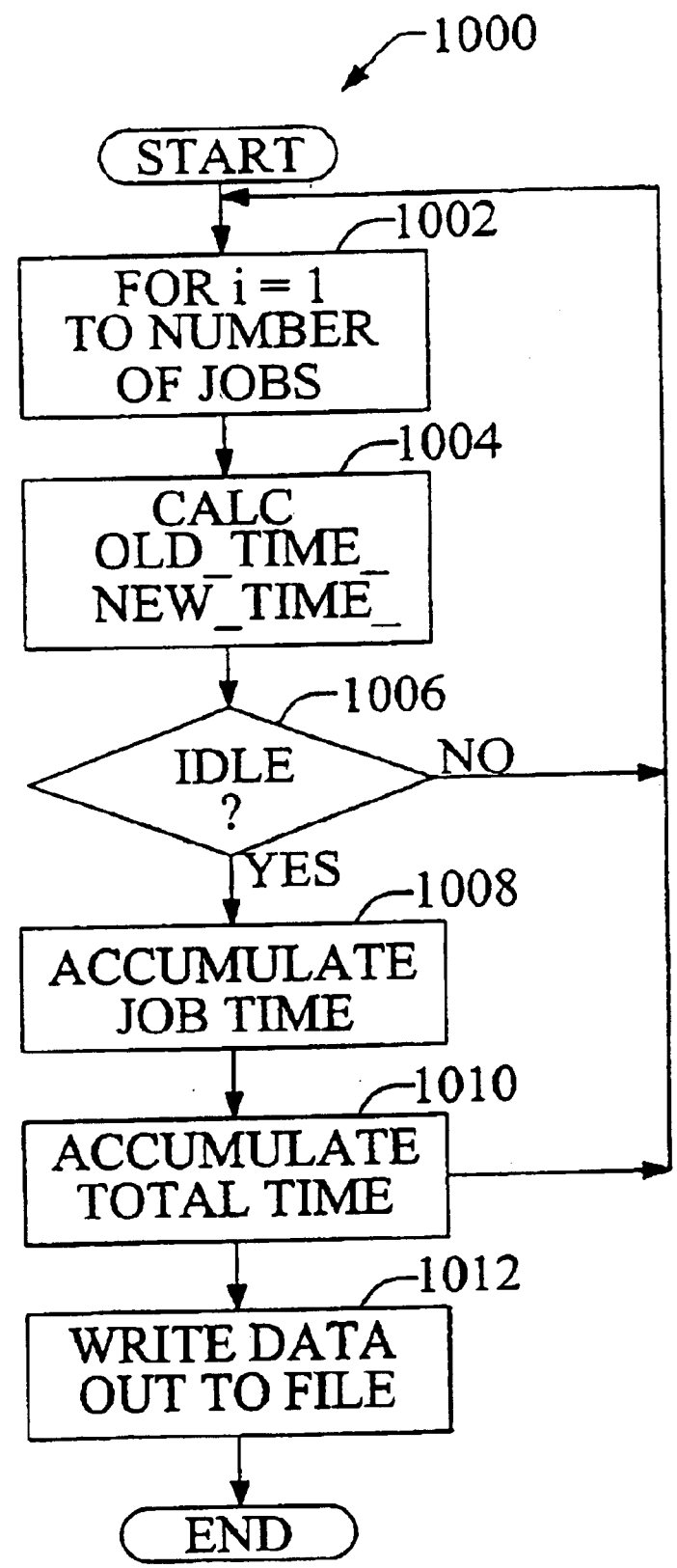
FIG. 10 illustrates the use of active timers according to one embodiment of the present invention.

FIG. 10 is a flow chart illustrating a routine 900 for checking active times in Block 914 in the analyzer routine of FIG. 9, which is the logic for keeping the "plates spinning". Block 1002 starts a timing loop for each job. Block 1004 calculates the difference in time between activities. Block 1006 tests if the allowable idle time is exceeded to stop that stop watch. If not, the routine loops back to Block 1002 for another job. If the idle time is exceeded, Block 1008 accumulates the job time. If it's time to stop that stop watch, then we accumulate the total time in Block 1010 and go back to do the next job. If it's not time to stop the stop watch, we go on to the next task. All tasks are looked at to determine if there's any activity. If any files are updated, Block 1012 writes the data out to the file.

An event analyzer module reads the activity log file over a particular range of days. Another module called a reports module provides an external interface to the system according to the invention. Data can be imported from other programs and project manager. Exports can be made to database project managers, etc. to provide printed reports, invoices and summary information.

The event analyzer for the time tracking system is described in the following pseudo code to function as follows: 1. For each job or task, there are four times:a. total time (all time since last reset/billing)b. current time (all time since last job start)c. active time (time of last event)d. idle time (timeout for end of job)Total and Current time are relative (i.e. they represent total hours/minutes/seconds). Active time is real-time and is used to compare with event times to determine if a job has exceeded its idle time limit. Below are two pseudo-code routines for determining the time spent on a given work activity.

Figure 11:
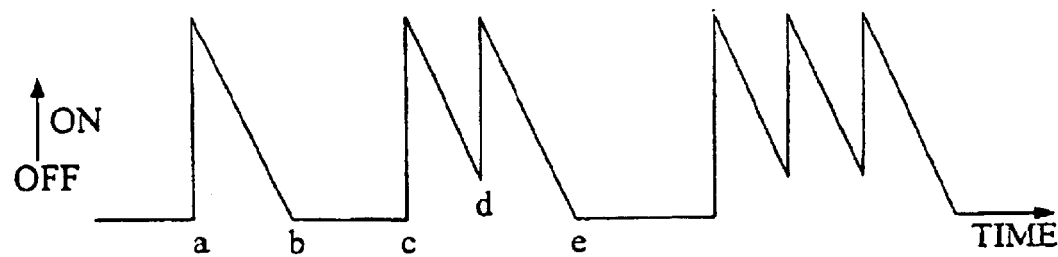
FIG. 11 is an illustrative timing diagram illustrating starting, restarting, and ending of an analyzer timer for a task, according to an embodiment of the present invention.

Analyzer Loop
Load all total times from file
Zero all current timesagain:
get next eventdetermine which job this event belongs to . . .
If it is NO_JOB then it is a 'system' event
which we can use to check active times
so we CheckActiveTimes( )
otherwise if
(old event time!=0)
currentTime[job]+=this event time–old event time
set activeTime [job]=this event time
CheckActiveTimes( ) for all other jobs to determine if idle
goto again
CheckActive Times( )
for(i=1 to # of jobs)
if this event time–old event time [i]>idle [i]
job is idle
if old event time[i] !=0
currentTime[i]=old event time+idle [i]
total time[i]+=currentTime[i]
if any totals updated then
Write totalTime file
Write a record to the job worked file
Write a record to the cumulative job file for this job FIG. 11 is an illustrative timing diagram illustrating starting, restarting, and ending of an analyzer timer for a task, according to the invention. An explanation of how a work computation data analyzer operates is as follows: For each task a "re-triggerable one-shot" monostable timer is kept. This means that the timer can be reset from its current position to the maximum position at any time. It only expires if nothing has retriggered before the timeout value.

A waveform for such a timer is shown in FIG. 11:
At time a, the timer is started.
At time b, the first timer expires.
At time c, the timer is started.
At time d, the timer is re-started.
At time e, the timer expires.

Figure 12:
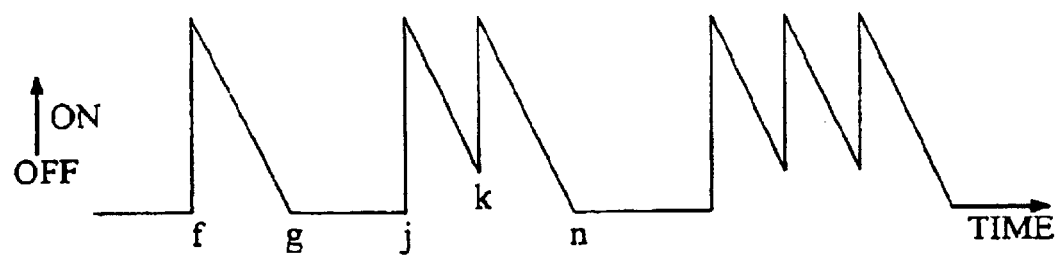
FIG. 12 is an illustrative timing diagram for two tasks illustrating the operation of an analyzer timer.
Figure 13:
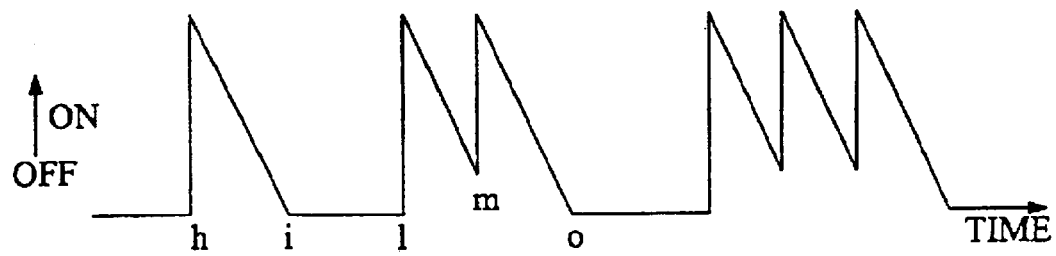
FIG. 13 is an illustrative timing diagram for two tasks illustrating the operation of an analyzer timer.

FIGS. 12 and 13 are illustrative timing diagrams for two tasks illustrating operation of respective analyzer timers. If one imagines "start" as the detection of activity for a certain task then each re-start is another detection of activity for that same task. Only when the timer "expires" does the work analyzer decide that work has been performed. That is when the time between the last event for this task and the current event for this task is greater than the idle time.

In the work analyzer one of these "timers" is created for each task in the user's database. When an activity is seen, the activity starts and restarts the timer. At the end of the analyzed time all the timers are assumed to have expired. A waveform form is shown in FIGS. 12 and 13 with a user working on two tasks:
At time f, start task 1.
At time g, end task 1.
At time h, start task 2.
At time i, end task 2.
At time j, start task 1 again.
At time k, restart task 1.
At time 1, start task 2 again.
At time m, restart task 2.
At time n, end task 1.
At time o, end task 2.
And so forth.

Classification of Tracking Opportunities

In one embodiment of the present invention, as a user performs activities on a wireless device, the data collector observes and records the activities. Once recorded the activities need to be classified into categories that constitute meaningful work. Depending on the application, meaningful work classifications can be wireless related, they might be internal and common to wireless devices, or they might be desktop related. The tracking function that executes on the wireless device is responsible for recognizing the occurrence of these activities and collecting the data associated with these activities, for instance by generating a log file that records the activity and when it happened.

There are seven (7) general wireless operating modes related to the operating types of wireless devices. These wireless operating modes include the following:
 1. E-mail Send and Receive;
 2. Non-Message Send and Receive;
 3. Generic Protocol I/O, such as TCP/IP and Web browser;
 4. Radio Activity;
 5. Infrared Activity; and
 6. Streaming Activity, such as a phone call;
 7. Non-email message oriented traffic, such as personal text messaging.

There are four (4) general internal operating modes related to the operating types of wireless devices. These internal operating modes include the following:
1. Voice recognition, such as phones;
2. Database Accesses;
3. Custom Applications; and
4. Virtual Machine operations, such as the Javaâ virtual machine or other common language runtime (CLR) operations.

There are five (5) general desktop related operating modes related to the operating types of wireless devices. These desktop related operating modes include the following:
1. Synchronization events;
2. Uploads;
3. Downloads;
4. Setup and Install operations; and
Conduit activities.

Activity Type Indicator

All of the above activities might define work for the purposes of a time and work tracker depending upon what work needs to be tracked. Furthermore, each activity can be categorized as having either a start indication, a switch indication, or a continue indication. Start activities include, for example, low level socket or URL connections, polling of a remote device, receiving a poll from a remote system, starting an application (i.e., in devices like PALM, RIM, etc.), and making a request to send a formatted package (i.e., e-mail, web page, etc.)

Switch activities include, for instance: communication to a different device address or IP address, changing or shutting down an application (i.e., PALM, RIM, etc.), any equivalent to flash switchook used by telephones (i.e., on a cell phone the send key may be used to switch conversations or conference in third parties, or a channel change (i.e., for MP3 or video devices). Continue activities include data packet I/O (specifically where it can be determined which device the I/O is from/to by device ID or IP address) or streaming media transfer (in or out).

The activity type indicator associated with each entry maintained by the data collector, instructs the data analyzer how to handle the activity timers. Take, for example, the use of a cellular phone where certain calls are defined to constitute meaningful work. After the time and work tracker is initiated on the cellular device, the user makes a call to a specific phone number that has been pre-determined to constitute meaningful work. The data collector records the activity of initiating the call and the number called and classifies the activity as a start activity. As the call proceeds, the data collector records the transfer of packets and calls these activities continue activities. Eventually the call ends, which either will be indicated by a new start activity in the data collector or an idle timeout.

If during the call, the user received another call and answered it, such an activity would be classified by the data collector as a switch indication. At that point, the analyzer would stop timing the initial conversation and start a new timer for the new work (if it is characterized as work also). Each time a continue activity is recognized by the analyzer, the idle timer is reset to zero. In this manner, a timeout will occur if there is a lapse in a single work activity only when there is no continue activity for longer than the idle timeout period.

Figure 14:
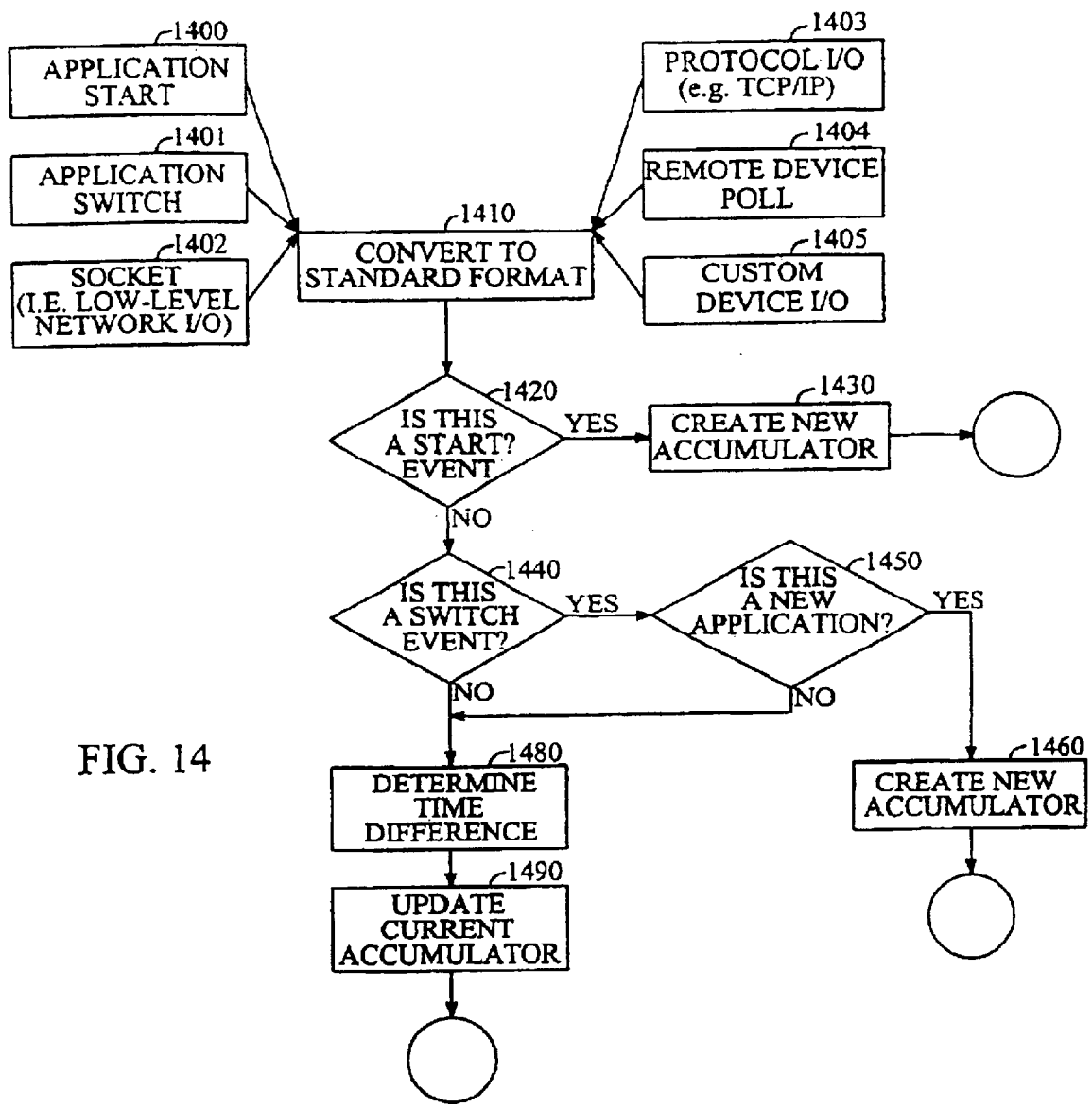
FIG. 14 is a flowchart showing the use of activity type indicators to time work events according to an embodiment of the present invention.

FIG. 14 is a flowchart showing the use of activity type indicators to time work according to an embodiment of the present invention. Initially an event occurs, which is recorded by the data collector that starts the operation of a work activity timer. For instance at block 1400 an application starts, or at block 1401 an application switches, or at block 1402 a low level I/O operation occurs on the network (i.e., a socket), or at block 1403 a remote device poll occurs 1404, or at block 1405 a custom device I/O occurs.

Assuming that blocks 1400–1405 constitute meaningful work, they are converted to a standard format at block 1410. At block 1420, it is determined if this is a start event. If so, then at block 1430 a new accumulator is started. Otherwise, it is determined at block 1440 if this is a switch event. If so, it is determined at block 1450 if this is a new application. If so, a new accumulator is created at block 1460. If this is not a new application at block 1450 or if this is not a switch event at block 1440, the time difference is determined at block 1480 and the current accumulator is updated at block 1490.

Wireless Operating Modes

To determine classification criteria, the wireless operating mode and its respective seven (7) tracking modes are described for the purpose of example. In the wireless operating mode, it is determined whether information may be extracted and classified as either a start or a continue indication.

E-mail Send and Receive

Wireless devices often are capable of sending e-mail messages. Using internal software, each wireless device is capable of composing a message that is sent to a server. The device also is capable of receiving messages that come from the server. E-mail uses a store and forward paradigm. As such, other wireless devices, such as non-computing appliances are also capable of sending e-mail without human interaction. For instance, a smart refrigerator might send messages to keep track of its contents or a water meter might send messages to track daily usage.

E-mail consists of the following components: (1) a sender; (2) a recipient (3) a subject, (4) a body, and (5) optional attachments. A start activity comprises the initiation of a send or receive. A continue activity comprises sending each component, as well as transferring the body in multiple segments and/or transferring the attachments in single or multiple segments. Items which are tracked specifically of generically in various embodiments of the present invention include, for instance:

Specific E-Mail Addresses

E-mail addresses always consist of a user, an @ character, and the name of the destination server. (e.g., someone@someserver.com)

Generic tracking is also performed using wildcards on either the user or server name. (e.g., *@discovision.com or *@engr.sun*.com).

Specific IP Addresses

E-mail addresses also may use a specific IR address to identify a specific source or destination. IP addresses take the form a.b.c.d. These items may also be tracked generically using wildcards (e.g., 201.55.103.*).

Data Format

In one embodiment, work is tracked based on the size of the data being transferred. For example, if pictures are being sent to a specific client as a component of an individual's work, then it might be decided that a picture transfer constitutes work for that client.

Data Contents

It also is meaningful to track work based on the contents of the mail, even if it is only text. In one embodiment, a project or task ID is inserted into the mail contents. The project or task ID is used to do fine grained tracking on the mail.

Non-Message Send and Receive

Many wireless devices send and receive custom message formats unrelated to internet e-mail. These are related to normal operating actions or to specific actions, such as synchronizing with a base station. In each case, some form of addressing is identified, (i.e., to whom the message is being sent or from whom is the message being received), as well as possibly evaluating the contents of the data. Similar to the start and continue actions for e-mail, non-message send and receive actions include connecting, sending one or more message segments, and receiving one or more message segments.

Peer to Peer Communications

This involves short, small messages. The message contents can also be useful for tracking data.

File Transfers

This involves transfer of a specific set of data of a known format (i.e., a picture, sound, clip, zip file, video, etc).

Data Format

Like with e-mail, if the format for the data is well known (i.e., JPEG image or MP3 audio clip), this is used as its own criteria for tracking independent of the sender or receiver.

Miscellaneous Communications

This is a category that defines such activities as synchronization and backup. These operations are specific actions and may be tracked. This typically involves many different data formats and data contents multiple clients.

Generic Protocol I/O (i.e., TCP/IP and Web Browser)

Regardless of how communication is performed (i.e., wireless, wired, or infrared), if a specific protocol (e.g., TCP/IP, HTTP, FTP, etc) is used, tracking is done using the address states of the protocol.

Custom Applications

On most wireless devices, users are able to install their own custom applications that originally did not come with the device or were written by a third party. When protocol tracking is used, detection of which application is using the protocol constitutes a tracking criteria.

Data Format

Like with e-mail, if a well-known data format is used (e.g., JPEG or MP3), the format is used as its own criteria for tracking independent of the sender or receiver.

Radio Activity

When radio is used for wireless activity, specific radio activities are tracked. Start and continue event detection is more complex, since radio connections are intermittent and often fail. Often the radio activity is completed by a different cell than the one that started the activity. Here, application source can be used to combine with radio identifications to track activity.

Start/Stop

Almost all wireless devices are polling even though they appear to push (i.e., information can be sent to them without the end-user asking). Therefore, each communication to a radio cell does not necessarily constitute a start of work. Therefore, each communication is tracked and converted to a work start once data starts flowing.

Which Radio Cells are Involved

For location based activities (e.g., in the field repair people) it is useful to know which radio cells are involved.

Data Format

Like with e-mail, if a well-known data format is used (e.g., JPEG or MP3), the format is used as its own criteria for tracking independent of the sender or receiver.

Streaming Activity

Start/Stop

In this scenario the user initiates all activity even in the case of receiving (they have to answer the call).

Data Format

Like with e-mail, if a well-known data format is used (e.g., JPEG or MP3), the format is used as its own criteria for tracking independent of the sender or receiver.

Participant ID(s) (i.e., Phone Numbers)

In any scenario where a phone number is available. Text messaging (i.e., SMS) is treated the same as e-mail since that is actually the underlying mechanism used.

Embodiment of a Wireless Data Collector

In one embodiment, a wireless data collector is implemented on a Palm handheld device. The wireless data collector watches user activity for both the changing state of the application and for wireless communication activities. On the Palm devices, the data collector applications are implemented via a mechanism known as hacks. The hacks necessary to implement an embodiment of the present invention are shown in the source code listed in Appendix A.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A time and work tracker comprising:

a time and work tracking function on a server;

one or more activities configured to be performed on a device;

a synchronization mechanism configured to transfer information relating to said activities from said device to said server;

one or more rules configured to be obtained; and a printing module configured to use said rules to output one or more pre-defined activities of interest and to exclude said activities that do not constitute said pre-defined activities of interest.

2. The time and work tracker of claim 1 wherein said information is organized in a log file.

3. The time and work tracker of claim 1 wherein said device comprises a streaming audio/video device, a portable messaging and database device, a general purpose computing device, or a non-computing appliance.

4. The time and work tracker of claim 1 wherein said information is associated with a wireless related activity, an internal activity, or a desktop related activity.

5. The time and work tracker of claim 1 further comprising a start activity, a switch activity, or a continue activity, wherein said information is configured to be classified as either said start, said continue, or said switch activities.

6. The time and work tracker of claim 1 wherein said information is included in a memory location.

7. The time and work tracker of claim 3 wherein said streaming audio/video device comprises a phone or a wireless phone.

8. The time and work tracker of claim 3 wherein said portable messaging and database device comprises a Personal Data Assistant (PDA) or a laptop computer.

9. The time and work tracker of claim 3 wherein said general purpose computing device comprises a computer with network connectivity.

10. The time and work tracker of claim 3 wherein said non-computing appliance comprises a dedicated purpose computing device, such as a refrigerator, an automobile, or a microwave.

11. A method for tracking time and work comprising:

initiating a time and work tracking function on a server;

performing one or more activities an a device;

transferring information relating to said activities from said device to said server;

obtaining one or more rules on said server; and using said rules in a printing module to output one or more pre-defined activities of interest and to exclude said activities that do not constitute said pre-defined activities of interest.

12. The method of claim 11 wherein said information is organized in a log file.

13. The method of claim 11 wherein said device comprises a streaming audio/video device, a portable messaging and database device, a general purpose computing device, or a non-computing appliance.

14. The method of claim 11 wherein said information is associated with a wireless related activity, an internal activity, or a desktop related activity.

15. The method of claim 11 further comprising a start activity, a switch activity, or a continue activity, wherein said information is configured to be classified as either said start, said continue, or said switch activities.

16. The method of claim 11 wherein said data information is included in a memory location.

17. The method of claim 13 wherein said streaming audio/video device comprises a phone or a wireless phone.

18. The method of claim 13 wherein said portable messaging and database device comprises a Personal Data Assistant (PDA) or a laptop computer.

19. The method of claim 13 wherein said general purpose computing device comprises a computer with network connectivity.

20. The method of claim 13 wherein said non-computing appliance comprises a dedicated purpose computing device, such as a refrigerator, an automobile, or a microwave.

* * * * *

UNITED STATES PATENT AND TRADEMARK OFFICE
CERTIFICATE OF CORRECTION

| | | |
|---|---|---|
| PATENT NO. | : 6,789,045 B2 | Page 1 of 1 |
| APPLICATION NO. | : 10/250195 | |
| DATED | : September 7, 2004 | |
| INVENTOR(S) | : Michael G. Lehman | |

It is certified that error appears in the above-identified patent and that said Letters Patent is hereby corrected as shown below:

*On the Title Page:* Item (73) Assignee

Delete "Discovision Associates" before "Irvine, CA (US)", and replace thereof

--Research Investment Network, Inc.--

Signed and Sealed this

Twenty-second Day of May, 2007

JON W. DUDAS
*Director of the United States Patent and Trademark Office*